United States Patent
Landers, Jr. et al.

(10) Patent No.: US 8,510,170 B2
(45) Date of Patent: Aug. 13, 2013

(54) POWERING A POINT OF SALE PRINTER AND COUPON PRINTER FROM A SHARED POWER SUPPLY

(75) Inventors: John D. Landers, Jr., Raleigh, NC (US); David J. Steiner, Raleigh, NC (US); Paul M. Wilson, Cary, NC (US); Kimberly A. Wood, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 183 days.

(21) Appl. No.: 12/975,569

(22) Filed: Dec. 22, 2010

(65) Prior Publication Data
US 2012/0166297 A1 Jun. 28, 2012

(51) Int. Cl.
| | |
|---|---|
| G07G 1/00 | (2006.01) |
| G07G 1/14 | (2006.01) |
| G06Q 20/00 | (2012.01) |
| G06G 1/12 | (2006.01) |
| H01R 11/30 | (2006.01) |
| H01R 13/60 | (2006.01) |
| H01R 13/62 | (2006.01) |
| G06K 15/00 | (2006.01) |
| G06F 3/12 | (2006.01) |
| B41J 11/44 | (2006.01) |
| B41J 5/30 | (2006.01) |
| B41J 5/40 | (2006.01) |
| B41J 9/44 | (2006.01) |
| G06F 11/00 | (2006.01) |
| G06K 3/00 | (2006.01) |
| G06K 7/00 | (2006.01) |

(52) U.S. Cl.
USPC ......... 705/24; 705/16; 705/21; 439/40; 439/157; 439/159; 358/1.16; 358/1.15; 400/76; 400/61

(58) Field of Classification Search
USPC ............. 705/24, 16, 21; 439/40, 157, 159; 358/1.15, 1.16; 400/76, 61
See application file for complete search history.

(56) References Cited

U.S. PATENT DOCUMENTS

| | | | | |
|---|---|---|---|---|
| 4,009,959 | A | * | 3/1977 | Watson et al. .............. 355/71 |
| 4,275,968 | A | * | 6/1981 | Irwin .......................... 400/582 |

(Continued)

FOREIGN PATENT DOCUMENTS

JP 2006-48594 A 2/2006

OTHER PUBLICATIONS

USB serial Bus Power MGMT by Kevin Lynn, Micrel Semiconductor: IEEE 1998, IDS submitted Dec. 22, 2010.*

(Continued)

*Primary Examiner* — Matthew Gart
*Assistant Examiner* — Harshad Parikh
(74) *Attorney, Agent, or Firm* — Patterson & Sheridan, LLP

(57) ABSTRACT

A point of sale (POS) system includes primary and auxiliary printers powered by a shared power supply. A POS terminal includes the shared power supply, a user interface, and a host including a printer driver for dynamically generating primary print commands. A printer connection card connected to the POS terminal includes a Universal Serial Bus (USB) hub in communication with the host and having at least one USB connector powered by the shared power supply. The primary printer is connected to the USB hub for receiving power and the primary print commands through the USB hub from the POS terminal. An auxiliary printer has a power-only connection to the printer connection card, receiving independently generated auxiliary print commands from a separate host computer. A controller includes control logic for selectively blocking the primary print commands to the primary printer in response to the signal drawn by the auxiliary printer exceeding a threshold.

20 Claims, 2 Drawing Sheets

(56) References Cited

U.S. PATENT DOCUMENTS

| | | | |
|---|---|---|---|
| 4,699,532 A * | 10/1987 | Smith | 400/104 |
| 4,992,958 A * | 2/1991 | Kageyama et al. | 358/1.17 |
| 5,056,018 A * | 10/1991 | Ikoma | 705/24 |
| 5,477,476 A * | 12/1995 | Schanin et al. | 713/324 |
| 5,649,839 A * | 7/1997 | Yu | 439/650 |
| 5,667,315 A * | 9/1997 | Smith | 400/78 |
| 5,734,392 A * | 3/1998 | Cornell | 347/17 |
| 5,755,521 A * | 5/1998 | Ito et al. | 400/605 |
| 5,894,543 A * | 4/1999 | Yoshida et al. | 358/1.14 |
| 5,901,067 A * | 5/1999 | Kao et al. | 700/11 |
| 6,205,363 B1 * | 3/2001 | Miyasaka et al. | 700/9 |
| 6,330,069 B1 * | 12/2001 | Kim | 358/1.14 |
| 6,505,170 B1 * | 1/2003 | Seifert et al. | 705/21 |
| 6,624,994 B1 | 9/2003 | Schmoock et al. | |
| 6,665,764 B2 | 12/2003 | Wurzburg | |
| 6,827,260 B2 * | 12/2004 | Stoutenburg et al. | 235/380 |
| 6,876,469 B1 * | 4/2005 | Nakamura | 358/437 |
| 6,944,689 B2 * | 9/2005 | Billington et al. | 710/62 |
| 7,140,919 B2 * | 11/2006 | Yu | 439/620.13 |
| 7,206,544 B2 * | 4/2007 | Forrest | 455/41.2 |
| 7,548,041 B2 | 6/2009 | Zemke et al. | |
| 7,600,673 B2 * | 10/2009 | Stoutenburg et al. | 235/380 |
| 7,746,036 B2 | 6/2010 | Wolf et al. | |
| 8,005,391 B2 * | 8/2011 | Cook | 399/82 |
| 8,201,726 B2 * | 6/2012 | Scott et al. | 235/375 |
| 8,266,456 B2 * | 9/2012 | Chang et al. | 713/300 |
| 2001/0001838 A1 * | 5/2001 | Miyasaka et al. | 700/17 |
| 2002/0156683 A1 * | 10/2002 | Stoutenburg et al. | 705/16 |
| 2003/0086106 A1 * | 5/2003 | Parry | 358/1.13 |
| 2003/0090271 A1 * | 5/2003 | Hurwicz | 324/424 |
| 2004/0123751 A1 * | 7/2004 | Vega | 101/114 |
| 2004/0157474 A1 * | 8/2004 | Rapaich | 439/43 |
| 2004/0172527 A1 | 9/2004 | Ono et al. | |
| 2005/0283403 A1 * | 12/2005 | Ramirez et al. | 705/16 |
| 2006/0003605 A1 * | 1/2006 | Brooks et al. | 439/40 |
| 2006/0182458 A1 * | 8/2006 | Hall et al. | 399/88 |
| 2007/0285682 A1 * | 12/2007 | Lutnesky et al. | 358/1.8 |
| 2008/0162952 A1 * | 7/2008 | Landers et al. | 713/300 |
| 2008/0176444 A1 * | 7/2008 | Chan et al. | 439/505 |
| 2009/0059454 A1 | 3/2009 | Chu | |
| 2009/0076921 A1 * | 3/2009 | Nelson et al. | 705/16 |
| 2009/0102431 A1 | 4/2009 | Kung et al. | |
| 2009/0145958 A1 * | 6/2009 | Stoutenburg et al. | 235/376 |
| 2009/0170230 A1 * | 7/2009 | Kidu et al. | 438/35 |
| 2009/0213515 A1 | 8/2009 | Phillips et al. | |
| 2009/0244624 A1 * | 10/2009 | Endo | 358/1.16 |
| 2010/0026270 A1 | 2/2010 | Yang et al. | |
| 2010/0166447 A1 * | 7/2010 | Cook et al. | 399/88 |
| 2010/0191984 A1 | 7/2010 | Ghosh et al. | |
| 2010/0196064 A1 * | 8/2010 | Burton et al. | 399/323 |
| 2010/0324978 A1 * | 12/2010 | Redmann et al. | 705/14.1 |
| 2011/0018955 A1 * | 1/2011 | Sekino et al. | 347/218 |
| 2011/0157661 A1 * | 6/2011 | Kim et al. | 358/475 |
| 2011/0184822 A1 * | 7/2011 | Matkovic | 705/18 |
| 2011/0213508 A1 * | 9/2011 | Mandagere et al. | 700/291 |
| 2011/0242599 A1 * | 10/2011 | Ohara | 358/1.15 |
| 2011/0279868 A1 * | 11/2011 | Taylor et al. | 358/1.15 |
| 2012/0166297 A1 * | 6/2012 | Landers et al. | 705/24 |
| 2012/0185306 A1 * | 7/2012 | Cheng | 705/14.4 |
| 2012/0271725 A1 * | 10/2012 | Cheng | 705/21 |
| 2013/0010317 A1 * | 1/2013 | Sai | 358/1.13 |

OTHER PUBLICATIONS

HP delivers Business solutions, Annonymous, Life Science Weekly, Sep. 23, 2008: 4052.*

Yamamoto, "Patent Abstracts of Japan—Publication No. 2006-048594", English translation, Date of publication: Feb. 16, 2006, pp. 1-7.

Lynn, "Universal Serial Bus (US) Power Management", IEEE 0/7803-5078-2/98, 1998, pp. 194-201.

* cited by examiner

POWERING A POINT OF SALE PRINTER AND COUPON PRINTER FROM A SHARED POWER SUPPLY

BACKGROUND

1. Field of the Invention

The present invention relates to checking out items for purchase in a retail environment, and more particularly for powering and controlling separate primary and auxiliary printers at a point of sale.

2. Background of the Related Art

Point Of Sale ("POS") systems are specialized computer systems used in retail environments for facilitating the purchase of goods and other items by a customer. Modern POS systems typically include one or more POS terminals connected to a POS controller that aggregates and administers POS transaction data. Each POS terminal is typically located on a checkout counter and used by an operator to complete customer sales. A POS terminal typically includes user interface devices such as a cash register, check/debit card/credit card reader, bar code reader or radio frequency identification ("RFID") chip reader, and so forth. The POS terminals may include a payment terminal for communicating over a network to various external payment systems, such as a credit card, debit card, or check processing system.

A printer may be attached to a POS terminal for generating a customer receipt. The receipt may be printed in a selected font and include transaction-specific information, such as a list of items purchased and the associated prices, a total purchase price, the date and time of the purchase, customer information, and payment information such as credit or debit card information. Many POS systems also include a separate coupon printer for printing coupons, a loyalty program message, or other information additional to what is printed on the receipt. A coupon printer may be connected directly to a separate host computer by a local area network in the store. A coupon printer is conventionally powered by a separate power supply to avoid exceeding the operational limits of the power supply on the POS terminal, since POS printer typically have high peak current demands.

BRIEF SUMMARY

One embodiment of the present invention provides a point of sale (POS) system. A POS host computer includes a power supply, a user interface configured for scanning items, and a printer driver for dynamically generating primary print commands in response to the scanning of items. A printer connection card is connected to the POS terminal. The printer connection card includes a Universal Serial Bus (USB) hub in communication with the host and has at least one USB connector powered by the power supply from the POS terminal. A primary printer is connected to the USB connector for receiving power from the power supply and primary print commands through the USB hub from the POS terminal. An auxiliary printer is powered by the power supply through the printer connection card and receives auxiliary print commands from a separate host computer generated independently of the primary print commands. A sensor is configured for generating a signal in relation to the power drawn by the auxiliary printer. A controller is in communication with the sensor and includes control logic for selectively blocking the primary print commands to the primary printer in response to the signal drawn by the auxiliary printer exceeding a threshold.

Another embodiment of the invention provides a POS method. Items for purchase are electronically input. Primary print commands are selectively generated in response to the inputted items. Power and the primary print commands are both transmitted through a Universal Serial Bus (USB) connection to a primary printer. Printing is performed at the primary printer according to the primary print commands using the power transmitted through the USB connection. A signal is generated in relation to the power drawn by an auxiliary printer in response to executing an auxiliary print command generated independently from and asynchronously with the primary print commands. The primary print commands to the primary printer are blocked in response to the signal exceeding a threshold. In a related embodiment, the method may be implemented using computer usable program code embodied on a computer usable storage medium.

DETAILED DESCRIPTION

Embodiments of the invention include a system and method for powering an auxiliary printer from the same power supply used to power the primary printer of a point of sale (POS) terminal. In one embodiment, the primary printer is a receipt printer controlled directly by the POS host computer, and the auxiliary printer is a coupon printer that is controlled by a separate computer. Thus, primary print commands to the primary printer and auxiliary print commands to the coupon printer are sent asynchronously. The primary printer has a power and data connection to the POS host computer, while the auxiliary printer has a power-only connection to the card. The power supply is capable of powering either printer separately, but cannot power both printers simultaneously for more than a brief period, such as 1-2 seconds. According to one aspect, a controller is therefore provided for managing the printers so that each printer may be powered by the power supply on the POS host computer, without both printers operating simultaneously for more than a brief period. An embodiment of the invention may be implemented in a cloud-computing environment, wherein servers used to provide the various control functionality may reside in the cloud.

In one embodiment, the controller monitors the power consumption of the auxiliary printer using a sensor that measures an electrical parameter, such as current, that varies with the amount of power consumed by the auxiliary printer. If the monitored electrical parameter exceeds a threshold, the controller blocks print commands to the primary printer until the monitored electrical parameter falls back below the threshold. Thus, if the coupon printer is already printing when the POS host computer generates a print command to the primary printer, the USB hub may respond with a "device busy" message to the host until the coupon printer stops printing. Alternatively, if the primary printer is already printing when the coupon printer starts, further print commands to the primary printer may be blocked. The print commands to the primary printer are short enough (e.g. one line per print command) that the primary printer will stop printing shortly after receiving the last print command. The power supply is capable of providing a short burst of power sufficient to operate both printers simultaneously under such a condition.

Figure 1:
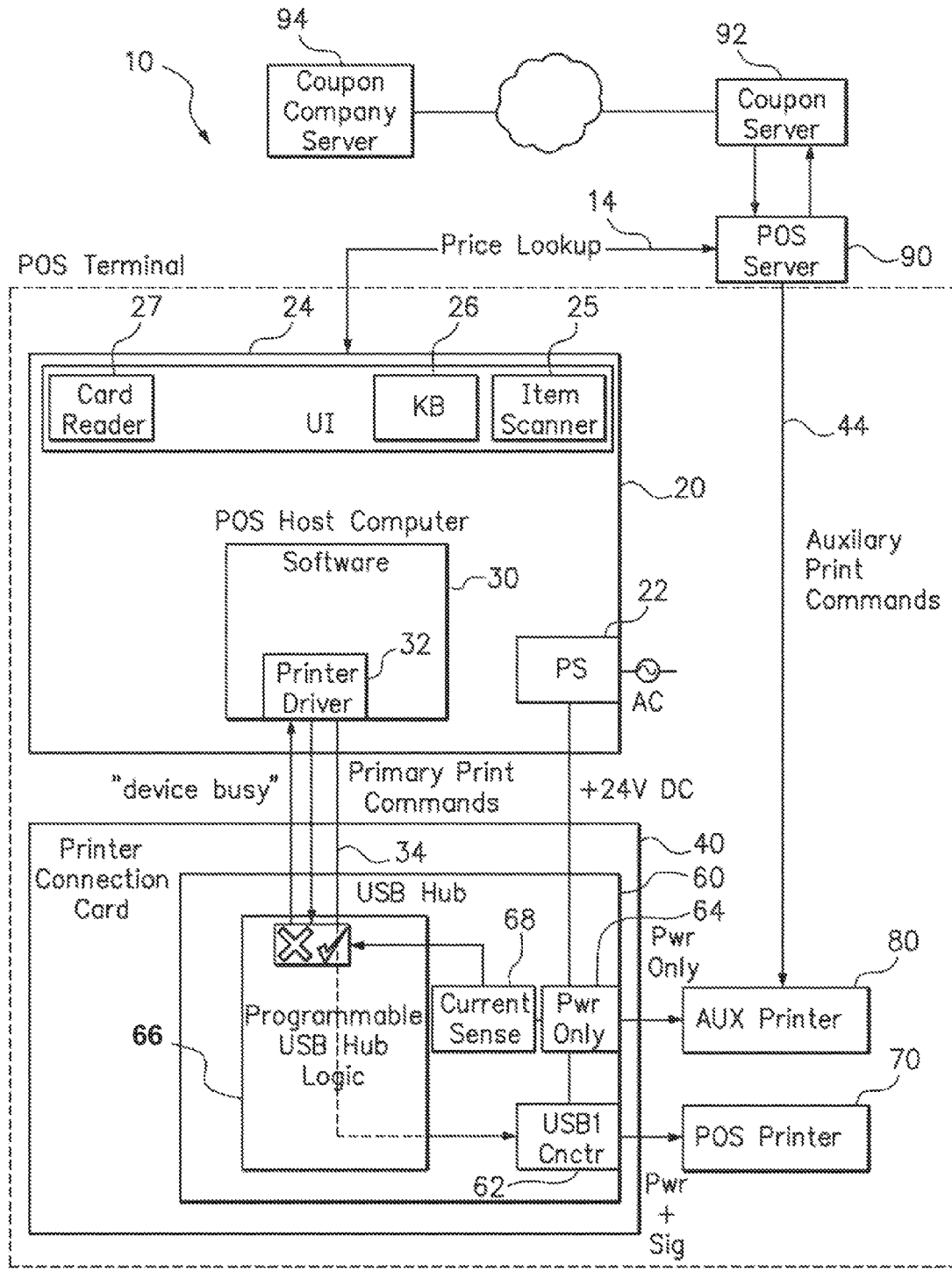
FIG. 1 is a schematic diagram of a POS terminal according to an embodiment of the invention wherein a POS printer and an auxiliary printer are both powered by a shared power supply.

FIG. 1 is a schematic diagram of a POS system including a POS terminal 10 according to an embodiment of the invention for use in a retail environment, such as a department store or grocery store. The POS terminal 10 includes a POS host computer 20 that controls all aspects of the POS terminal's operation. The host computer 20 controls a user interface (UI) 24 to facilitate the purchase of selected items by a shopper. Items may include machine readable tags affixed to the items, such as bar codes or radio frequency identification (RFID) tags, which correlate the items with pricing and other inventory information. The UI 24 interfaces with an item scanner 25 for scanning items with a machine-readable tag, and a keyboard 26 for manually inputting information, such as for items that lack a machine-readable tag. The UI 24 also interfaces with a card reader 27 for receiving payment information from the customer, such as a credit or debit card, shopper's card, and for inputting customer credentials. The POS host computer 20, and any number of other POS host computers, are connected to a POS server 90 over a local area network (LAN) 14. The POS server 90 may be located in a central location of the store, and contains a database of pricing information and other product information for items sold at the store. As items are scanned at the POS terminal 20, the POS host computer 20 communicates with the POS server 90 to look up pricing and other relevant information for the scanned items. The POS host computer 20 electronically generates a transaction record during the checkout process based on the pricing information obtained from the POS server 90. The transaction record may include the items selected for purchase, their prices, the payment information provided by the customer, and other information related to the transaction. A primary printer 70, controlled directly by the POS host computer 20, is used to print a written transaction record, such as a receipt.

An auxiliary printer 80 (which, in this embodiment, is configured as a coupon printer) is used to print other related information, such as coupons relevant to the selected items or a customer loyalty message. Whereas the POS terminal 10 and the POS server 90 may be owned and operated by the store, a coupon server 92 and the auxiliary (coupon) printer 80 are typically add-on accessories supplied by a third-party coupon company. In this embodiment, the coupon server 92 is in the store where the POS terminal 10 is located, but may alternatively be located anywhere there is a network connection, such as a remote location away from the store. In one implementation, the coupon server 92 communicates with a remote coupon company main server 94, which may be operated by the coupon company to offer coupons (typically, competitor coupons) selected according to the items purchased. The coupon company main server 94 may, for example, contain a database of competitor coupons each associated in a one-to-one correspondence with certain items. At the conclusion of the checkout, transaction data including the items scanned for purchase at the store may be communicated one-way by the coupon server 92 to the remotely located coupon company server 94. As indicated in FIG. 1, communication from the POS server 90 to the coupon server 92 is one-way. The coupon company server 94 may then automatically select coupons according to the transaction data and communicate the selected coupons back to the store via the coupon server 92. The coupon server 92 then generates an auxiliary print command 44 directly to the auxiliary printer 80 (optionally using the same store network) for printing the selected coupons. Thus, the primary print commands used to print a receipt on the primary printer 70 and the auxiliary print commands 44 used to print coupons on the auxiliary printer 80 are independently and asynchronously generated by separate host computers. The POS server 90 need not communicate with the coupon printer 80 at all.

A power supply 22 included with the POS host computer 20 supplies electrical power to various electronic components of the POS host computer 20. The power supply 22 may convert an alternating current (AC) power source, such as from an AC wall outlet, to a direct-current (DC) voltage, such as +24V DC. The power supply 22 has sufficient capacity to power either the primary printer 70 or the auxiliary printer 80 on a continuous basis. However, the primary printer 70 and auxiliary printer 80, when printing together, may consume in excess of an amount of power that a conventional power supply 22 is designed to provide. According to one aspect, therefore, novel hardware and control logic is provided to allow the primary printer 70 and auxiliary printer 80 to be powered from a shared power supply 22 on the POS host computer 20, without exceeding the operational limits of the power supply 22.

Software 30 is provided on the POS host computer 20 for operating some of the hardware included with the POS terminal 10, such as the UI 24 and the primary printer 70. The software 30 includes a printer driver 32, which dynamically generates print commands (the "primary print commands") 34 for the primary printer 70. No printer driver is required on the POS host computer 20 for the auxiliary printer 80 since the auxiliary printer 80 is controlled by print commands from a separate host computer. A printer connection card 40 serves as an electronic interface between the POS host computer 20 and the printers 70, 80, to provide electrical power from the power supply 22 to both printers 70, 80, and to provide data communication between the POS host computer 20 and the primary printer 70. The printer connection card 40 comprises a circuit board, to which a Universal Serial Bus (USB) hub 60 is connected, placing the USB hub 60 in electronic communication with the POS host computer 20. The USB hub 60 includes at least one powered USB connector 62 powered by the power supply 22 on the POS host computer 20. The powered USB connector 62 provides both electrical power and signal communication lines to the primary printer 70 for allowing the POS host computer 20 and the primary printer 70 to communicate through the USB hub 60. The auxiliary printer 80 is connected to the printer connection card 40 by a power-only connection 64. The power-only connection 64 may be provided, for example, by a second USB port on the USB hub 60, except that the auxiliary printer 80 may only use power pins but not data pins that may be provided in the second USB port. Other power-only electrical connections between the auxiliary printer 80 and the printer connection card 40 are also within the scope of the invention.

In one implementation, the printer driver 32 may generate a separate print commands 34 for each line to be printed on the primary printer 70. In that case, any buffering of data in the primary print commands may be limited to help ensure that a current line will be fully printed by the primary printer 70 before the next line is sent. Alternatively, the printer driver 32 could send multiple lines in a single print command, and be configured with the ability to selectively command the printer to pause printing. As the printer driver 32 generates a series of the primary print commands 34, the POS host computer 20 communicates the print commands 34 to the USB hub 60. The USB hub 60 includes control logic 66 for selectively routing data, including the primary print commands 34, through the USB hub 60 to the primary printer 70. Normally, while the auxiliary printer 80 is idle and not drawing power in excess of a threshold, the USB hub 60 routes the primary print commands 34 to the primary printer 70. The primary printer 70 will normally process the primary print commands 34 as they are received, so that the line or set of lines associated with the print commands are printed in the order the print commands are received. As the primary printer 70 processes the print instructions it consumes the electrical power provided over the printer connection card from the power supply 22. The auxiliary print commands 44, as noted above, are generated independently of the primary print commands 34, causing the auxiliary printer 80 to intermittently print at any given time. The auxiliary printer 80 also consumes power from the power supply 22 when printing.

Hardware and control logic is provided to prevent both printers 70, 80 from simultaneously printing. A sensor is provided to sense an electrical parameter and to generate a signal that varies with an amount of power consumed by the auxiliary printer 80. For example, the sensor in this embodiment is a current sensor 68 that senses the electrical current drawn by the auxiliary printer 80. The current sensor 68 outputs the current signal to the USB hub 60. The control logic on the USB hub 66 selectively blocks the primary print commands 34 depending on the current drawn by the auxiliary printer 80. When the auxiliary printer 80 is printing it will draw considerably more current than when the auxiliary printer 80 is off or idle. A threshold is selected, the value which is greater than the current that the auxiliary printer would normally consume when not printing, and which may be less than the current that the auxiliary printer would normally draw when printing. When the current is below the threshold, the USB hub 60 permits the primary print commands 34 to pass to the primary printer 70 through the USB hub 60. When the current rises above the threshold, the USB hub 60 automatically blocks any primary print commands 34 from being passed to the primary printer 70. A "device busy" signal may be passed to the POS host computer 20. As a result, the primary printer 70 will not start printing while the auxiliary printer 80 is already printing. Alternatively, if the primary printer 70 is already printing and the auxiliary printer 80 starts printing, the primary printer 70 will stop printing after the current line (or a small amount of buffer, if used) is completed. Microcode in the USB hub 60 and the primary printer 70, as well as in system driver software, may be optimized to minimize the time the primary printer 70 is printing.

The primary print commands 34 may be blocked in any of a variety of ways. In one configuration, the USB hub 60 detects that the auxiliary printer 80 has started printing because the current sensed by the current sensor 68 has risen above the threshold. In response to the current exceeding the current threshold, the USB hub 60 sends a notification to the POS host computer 20 that is routed to the printer driver 32. In response to the notification, the printer driver 32 may command the primary printer 70 to halt printing, and temporarily suspend transmitting or sending any more primary print commands while the current remains above the current threshold. The printer driver 32 in the POS host computer 20 may also send a command to the primary printer 70 to suspend printing. Optionally, the primary printer 70 can quickly complete any line currently being printed, if this will result in only a brief period (e.g. less than 2 seconds) during which both printers are printing. The power supply 22 will then only need to power both printers 70, 80 simultaneously for a short period of time. In response to the current drawn by the auxiliary printer 80 falling below the threshold, the USB hub 60 may send another notification to the printer driver 32 via the POS host computer 20 for the printer driver 32 to resume generating the primary print commands 34.

In another configuration, the USB hub 60 may again detect that the auxiliary printer 80 has started printing because the current sensed by the current sensor 68 has risen above the threshold. However, in response to the current exceeding the current threshold, the USB hub 60 sends a notification directly to the primary printer 70 to stop printing. Again, the primary printer 70 may quickly complete any current line being printed The USB hub 60 may also disconnect the primary printer 70 from the POS host computer 20 internally, from within the USB hub 60. When the auxiliary printer 80 stops printing, the current sensed by the current sensor 68 falls back below the current threshold. In response to the current drawn by the auxiliary printer 80 falling below the threshold, the USB hub 60 may send another command to the primary printer 70 to resume printing. The USB hub 60 may also reconnect the primary printer 70 to the POS host computer 20 internally, from within the USB hub 60, and resume passing primary print commands 34 to the primary printer 70.

In addition to embodiments providing new POS systems and methods, another embodiment involves reconfiguring an existing POS terminal so that an auxiliary printer may be powered from the same power supply that conventionally would have been used to power only a primary printer. The power supply may be the same power supply used in a conventional POS host computer, and that normally would be used to power only one printer. The power supply may have operational limits originally specified for use with the primary printer only, without the power capacity to power two printers simultaneously printing for an extended period. The disclosed hardware and control logic, such as a feedback system provided by a current sensor, a power-only connection to the auxiliary printer, and programmable USB hub and hub logic, is used to manage power from a shared power supply. Thus, both printers may be powered separately, and both printers may be powered together for a brief period, without exceeding the operational limits of even a conventional POS power supply.

Figure 2:
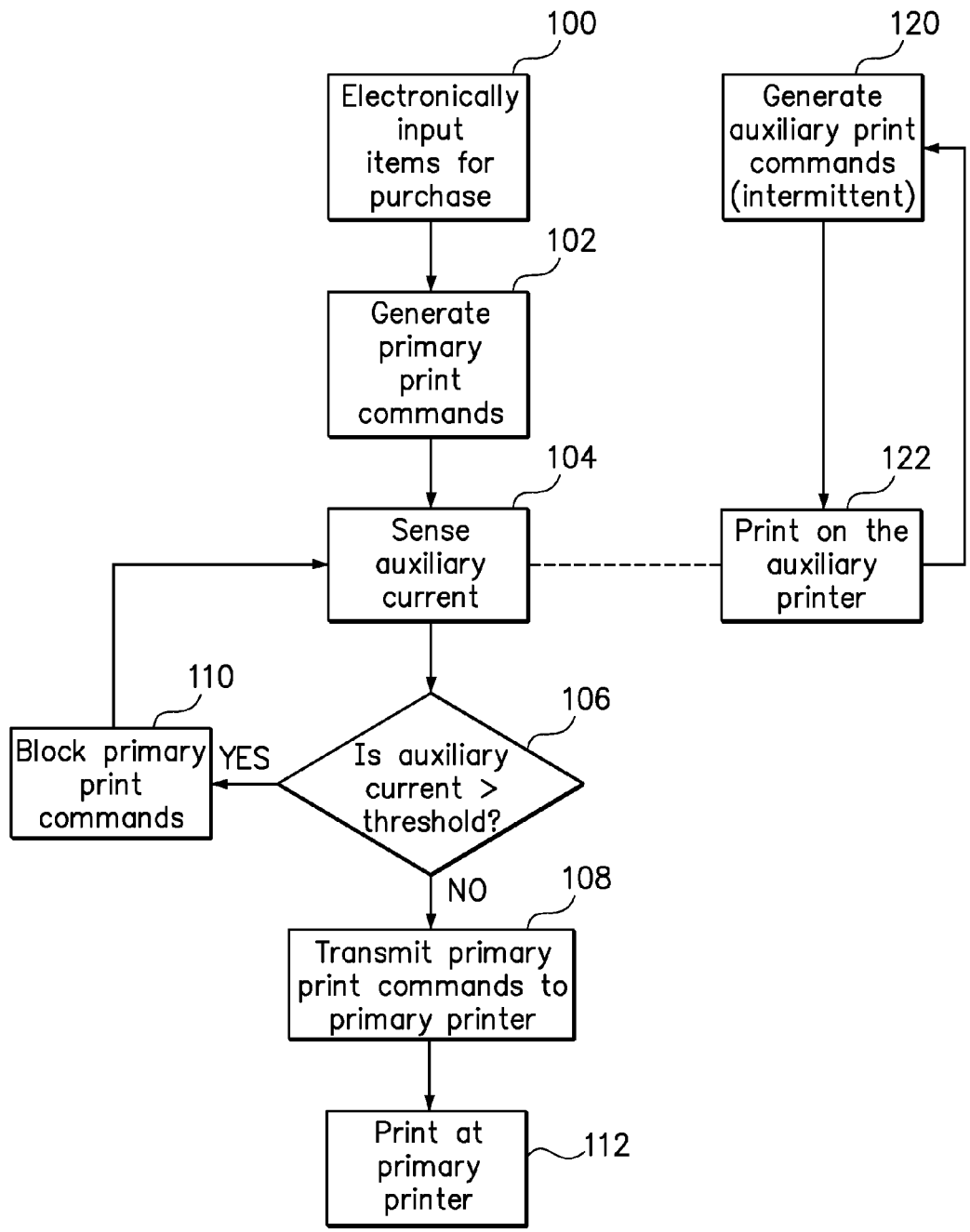
FIG. 2 is a flowchart of a method of managing power according to an embodiment of the invention.

FIG. 2 is a flowchart of a method of managing power according to an embodiment of the invention. Step 100 is to electrically input items for purchase at a POS terminal. Items may be electronically input by scanning the items or manually entering the items using a peripheral input device, as described above. In step 102, primary print commands are generated in response to the inputted items. The print commands may be limited in size, such as a separate command for each line to be printed at a primary printer. Each line may list an item, the price of the item, and the quantity of the item. Meanwhile, in a separate process, auxiliary print commands are generated in step 120 by an external system, such as a coupon or customer loyalty message generator. An auxiliary printer is available to print a coupon, loyalty message, or other auxiliary information immediately in response to receiving the print commands in step 122. The auxiliary print commands are generated intermittently. The auxiliary printer remains idle between executed auxiliary print commands, thus consuming more power while printing than when not printing.

In step 104, an electrical parameter is sensed that is directly related to the power consumed by the auxiliary printer. In this example, the electrical parameters is the electrical current drawn by the auxiliary printer. A threshold has been selected that is less than the current that the auxiliary printer normally consumes while printing. Thus, an auxiliary current that is greater than the threshold would indicate that the auxiliary printer is currently printing. In conditional step 106, the auxiliary current or other parameter is compared to the threshold. If the auxiliary current presently does not exceed the threshold, then the primary print command is transmitted to the primary printer in step 108 and printed in step 112. If the auxiliary current presently exceeds the threshold, then the primary print command is blocked in step 110. Eventually, the auxiliary printer will complete the current print command and return to an idle state, at which point the current is expected to drop below the threshold. When the auxiliary current falls below the threshold, according to conditional step 106, the primary print commands are again transmitted to the primary printer, effectively unblocking the primary print commands.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A point of sale (POS) system, comprising:
   a POS host computer including a power supply, a user interface configured to scan items, and a printer driver configured to dynamically generate primary print commands when the items are scanned;
   a printer connection card connected to the POS host computer, the printer connection card including a Universal Serial Bus (USB) hub in communication with the POS host computer and having at least one USB connector powered by the power supply from the POS host computer;
   a primary printer connected to the USB connector, wherein the primary printer is configured to receive power from the power supply and primary print commands through the USB hub from the POS host computer;
   an auxiliary printer powered by the power supply through the printer connection card and configured to receive auxiliary print commands from a separate host computer, wherein the auxiliary print commands are generated independently of the primary print commands;
   a sensor configured to generate an indication representing the power drawn by the auxiliary printer when executing a received auxiliary print command; and
   control logic in communication with the sensor, the control logic configured to:
      in response to the indication exceeding a threshold, block the primary print commands from being received at the primary printer thereby stopping the process of printing at the primary printer, wherein the primary printer remains connected to the USB connector while the primary print commands are blocked, and
      resume the printing process at the primary printer in response to the indication no longer exceeding the threshold.

2. The system of claim 1, wherein the control logic configured to block the primary print commands from being received at the primary printer comprises:
   control logic included with the USB hub for notifying the POS host computer that the indication has risen above or fallen below the threshold;
   control logic included with the POS host computer for routing the notifications to the printer driver; and
   control logic included with the printer driver for commanding the primary printer to stop the printing process when the indication has exceeded the threshold and for resuming the printing process when the indication no longer exceeds the threshold.

3. The system of claim 1, wherein the control logic configured to block the primary print commands from being received at the primary printer comprises:
   control logic included with the USB hub for directly instructing the primary printer to stop the printing process in response to the indication having exceeded the threshold and for instructing the primary printer to resume the printing process in response to the indication no longer exceeding the threshold.

4. The system of claim 3, wherein the control logic configured to block the primary print commands from being received at the primary printer further comprises:
   control logic on the USB hub for disconnecting the POS host computer from the primary printer in conjunction with directly instructing the primary printer to stop printing.

5. The system of claim 1, wherein the power supply has sufficient power capacity to power either the primary or auxiliary printer indefinitely, and insufficient capacity to power both the primary and auxiliary printers simultaneously for more than about two seconds.

6. The system of claim 1, wherein the auxiliary printer comprises a coupon printer.

7. The system of claim 1, wherein the printer driver is configured to halt the primary printer from printing at the conclusion of a current line being printed in response to the indication exceeding a threshold.

8. A point of sale (POS) method, comprising:
   electronically inputting items for purchase;
   selectively generating primary print commands in response to the inputted items;
   transmitting power and the primary print commands through a Universal Serial Bus (USB) connection to a primary printer;
   printing at the primary printer according to the primary print commands using the power transmitted to the primary printer through the USB connection;
   generating an indication representing the power drawn by an auxiliary printer in response to executing one or more received auxiliary print commands, wherein the auxiliary print commands are generated independently from and asynchronously with the primary print commands;
   blocking, in response to the indication exceeding a threshold, the primary print commands from being received at the primary printer thereby stopping the process of printing at the primary printer, wherein the primary printer remains coupled to the USB connection while the primary print commands are blocked; and
   resuming the printing process at the primary printer in response to the indication no longer exceeding the threshold.

9. The method of claim 8, further comprising:
   sending a notification to the POS host computer in response to the indication having risen above or fallen below the threshold; and
   generating a message from the POS host computer to the primary printer to stop the printing process in response to the indication having exceeded the threshold and for instructing the primary printer to resume the printing process in response to the indication no longer exceeding the threshold.

10. The method of claim 8, further comprising:
directly commanding the primary printer via the USB connection to stop the printing process in response to the indication having exceeded the threshold and directly commanding the primary printer via the USB connection to resume the printing process in response to the indication no longer exceeding the threshold.

11. The method of claim 10, wherein blocking the primary print commands comprises electronically disconnecting a POS host computer from the primary printer.

12. The method of claim 8, further comprising printing at both the primary and auxiliary printers until the primary printer finishes printing a current line.

13. The method of claim 8, further comprising:
transmitting an instruction from a network directly to the auxiliary printer for printing coupons selected according to the inputted items.

14. The method of claim 8, further comprising generating the primary print commands for printing on the primary printer one line at a time.

15. A computer program product comprising computer usable program code embodied on a non-transitory computer usable storage medium, the computer program product comprising:
computer usable program code for electronically inputting items for purchase;
computer usable program code for selectively generating primary print commands in response to the inputted items;
computer usable program code for transmitting the primary print commands through a Universal Serial Bus (USB) connection to a primary printer;
computer usable program code for printing at the primary printer according to the primary print commands using the power transmitted to the primary printer through the USB connection;
computer usable program code for generating an indication representing the power drawn by an auxiliary printer in response to executing one or more received auxiliary print commands, wherein the auxiliary print commands are generated independently from and asynchronously with the primary print commands;
computer usable program code for, in response to the indication exceeding a threshold, blocking the primary print commands from being received at the primary printer thereby stopping the process of printing at the primary printer, wherein the primary printer remains connected to the USB connection while the primary print commands are blocked; and
computer usable program code for resuming the printing process at the primary printer in response to the indication no longer exceeding the threshold.

16. The computer program product of claim 15, further comprising:
computer usable program code for sending a notification to the POS host computer in response to the indication having risen above or fallen below the threshold; and
computer usable program code for generating a message from the POS host computer to the primary printer to stop the printing process in response to the indication exceeding the threshold and for instructing the primary printer to resume the printing process in response to the indication no longer exceeding the threshold.

17. The computer program product of claim 15, further comprising:
computer usable program code for directly commanding the primary printer from the USB hub to stop the printing process in response to the indication exceeding the current threshold and for directly instructing the primary printer from the USB hub to resume the printing process in response to the indication no longer exceeding the threshold.

18. The computer program product of claim 15, wherein the computer usable program code for blocking the primary print commands comprises computer usable program code for electronically disconnecting a POS host computer from the primary printer.

19. The computer program product of claim 18, further comprising computer usable program code for printing on both the primary and auxiliary printers simultaneously until the primary printer finishes printing a current line.

20. The computer program product of claim 15, further comprising:
computer usable program code for transmitting an instruction from a network directly to the auxiliary printer for printing coupons selected according to the inputted items.

* * * * *